United States Patent
Qiu et al.

(10) Patent No.: US 11,350,192 B2
(45) Date of Patent: May 31, 2022

(54) METHOD FOR MULTI-RATE DATA INTERACTION IN OPTICAL NETWORK, NETWORK DEVICE AND NON-TRANSITORY COMPUTER-READABLE STORAGE MEDIUM

(71) Applicant: ZTE Corporation, Shenzhen (CN)

(72) Inventors: Yanbin Qiu, Shenzhen (CN); Liyong Cai, Shenzhen (CN); Peng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/273,664

(22) PCT Filed: Sep. 2, 2019

(86) PCT No.: PCT/CN2019/103981
§ 371 (c)(1),
(2) Date: Mar. 4, 2021

(87) PCT Pub. No.: WO2020/048419
PCT Pub. Date: Mar. 12, 2020

(65) Prior Publication Data
US 2021/0400364 A1    Dec. 23, 2021

(30) Foreign Application Priority Data
Sep. 5, 2018  (CN) .......................... 201811032512.0

(51) Int. Cl.
*H04Q 11/00*   (2006.01)

(52) U.S. Cl.
CPC . *H04Q 11/0067* (2013.01); *H04Q 2011/0064* (2013.01); *H04Q 2011/0086* (2013.01); *H04Q 2011/0088* (2013.01)

(58) Field of Classification Search
CPC ......................... H04Q 11/0067; H04J 14/0236
See application file for complete search history.

(56) References Cited

U.S. PATENT DOCUMENTS

2013/0121699 A1    5/2013   Murata
2014/0255027 A1*   9/2014   Hood ................. H04Q 11/0067
                                              398/58
(Continued)

FOREIGN PATENT DOCUMENTS

CN    103444111 A    12/2013
CN    107302397 A    10/2017
(Continued)

OTHER PUBLICATIONS

European Patent Office. Extended European Search Report for EP Application No. 19857613.4 dated Oct. 21, 2021, pp. 1-8.
(Continued)

*Primary Examiner* — Shi K Li
(74) *Attorney, Agent, or Firm* — Vivacqua Crane, PLLC (57) ABSTRACT

A method for multi-rate data interaction in an optical network, a network device, and a non-transitory computer-readable storage medium are disclosed. The method may include: acquiring a rate capability supported by an ONU; and interacting service data via a channel corresponding to the rate according to the rate capability supported by the ONU.

17 Claims, 6 Drawing Sheets

(56) References Cited

U.S. PATENT DOCUMENTS

2017/0223438 A1* 8/2017 Detwiler ............... H04Q 11/00
2017/0244487 A1* 8/2017 Gao .................. H04Q 11/0067
2017/0317779 A1* 11/2017 Wu ..................... H04L 47/6255
2018/0035183 A1   2/2018 Kim et al.
2020/0350992 A1* 11/2020 Liu ....................... H04B 10/25

FOREIGN PATENT DOCUMENTS

| CN | 108242953 A | 7/2018 |
| CN | 109217936 A | 1/2019 |
| CN | 109286864 A | 1/2019 |

OTHER PUBLICATIONS

The State Intellectual Property Office of People's Republic of China. First Office Action for CN Application No. 201811032512.0 and English translation, dated Nov. 3, 2021, pp. 1-20.
The State Intellectual Property Office of People's Republic of China. First Search Report for CN Application No. 201811032512.0 and English translation, dated Oct. 27, 2021, pp. 1-4.
International Search Report and Written Opinion for the International Patent Application No. PCT/CN2019/103981 dated Nov. 27, 2019.

* cited by examiner

METHOD FOR MULTI-RATE DATA INTERACTION IN OPTICAL NETWORK, NETWORK DEVICE AND NON-TRANSITORY COMPUTER-READABLE STORAGE MEDIUM

CROSS-REFERENCE TO RELATED APPLICATION

This application is a national stage filing under 35 U.S.C. § 371 of international application number PCT/CN2019/103981, filed Sep. 2, 2019, which claims priority to Chinese patent application No. 201811032512.0 filed Sep. 5, 2018. The contents of these applications are incorporated herein by reference in their entirely.

TECHNICAL FIELD

The present disclosure relates to (but is not limited to) the technical field of communication.

BACKGROUND

Currently, the optical device industry chain for Ethernet passive optical networks (PON), gigabit-capable passive optical networks (GPON) and 10G-PON has become mature. However, with the development of the Internet technology, the demand of users for network bandwidth is exploding, which poses a higher requirement for the bandwidth of a PON system. Therefore, 100G-PONs emerge. The 100G-PON technology is a point-to-multipoint PON access technology which meets a downlink rate of up to 100 Gbit.

SUMMARY

According to one aspect of the embodiments of the present disclosure, there is provided a method for multi-rate data interaction in an optical network, including: acquiring a rate capability supported by an optical network unit (ONU); and interacting service data via a channel corresponding to the rate according to the rate capability supported by the ONU.

According to another aspect of the embodiments of the present disclosure, there is provided a network device including a memory, a processor and a computer program stored in the memory and executable by the processor, where the computer program, when executed by the processor, causes the processor to perform the method for multi-rate data interaction in an optical network according to the present disclosure.

According to yet another aspect of the embodiments of the present disclosure, there is provided a non-transitory computer-readable storage medium storing a computer program which, when executed by a processor, cause the processor to perform the method for multi-rate data interaction in an optical network according to the present disclosure.

DETAILED DESCRIPTION

In order to make the technical problems to be dealt with, technical solution and advantages of the present disclosure clearer and more explicit, the present disclosure will be further described in detail below in reference to accompanying drawings and embodiments. It should be understood that the specific embodiments described herein are merely intended to explain the present disclosure rather than limit the present disclosure.

For an existing optical network unit (ONU), rate capabilities supported by an ONU user side are different. In view of the increase of demand on bandwidth and wavelength resource and cost factors, how to achieve rate compatibility in a new-generation 100G-PON system in order to facilitate the smooth upgrade of the system is a problem to be dealt with.

Figure 1:
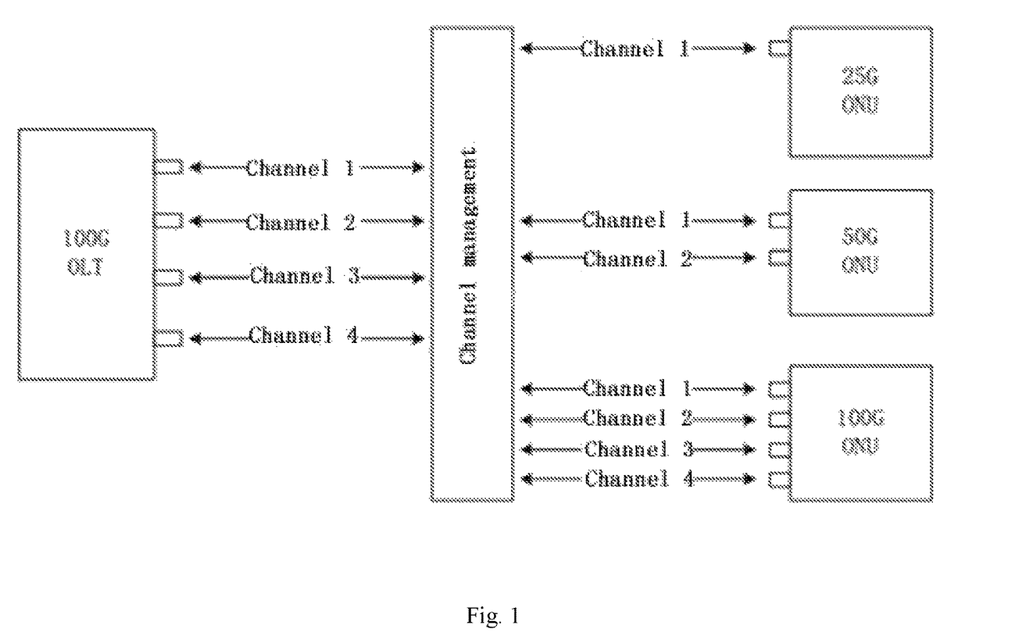
FIG. 1 is a schematic structural diagram of a 100G-PON system according to an embodiment of the present disclosure.

To this end, a 100G-PON network architecture is provided as shown in FIG. 1, and functions of network elements of a core network in the 100G-PON network architecture are as follows.

As a central office device in a passive optical network (PON) system, a 100 G optical line terminal (OLT) is a multiservice provisioning platform, which supports both IP service and conventional TDM service (time-division multiplexing mode). The 100 G optical line terminal is placed at the edge of a metropolitan area network or an exit of a community access network to converge and deliver access services to IP networks, respectively. The 100 G optical line terminal has the following functions: sending Ethernet data to an ONU in a broadcasting manner; initiating and controlling a ranging process, and recording ranging information; and allocating bandwidths to the ONU, i.e. controlling a starting time of data transmission by the ONU and the size of a sending window.

As a user-side device of the 100G-PON system, the ONU is configured to terminate service delivered from an OLT through the PON. Cooperating with the OLT, the ONU can provide various broadband services (e.g., Internet surfing, Voice over Internet Protocol (VoIP), high-definition TV (HDTV) and Video Conference) for a user connected. As a user-side device of Fiber To The X (FTTx) application, the ONU is a terminal device with high-bandwidth and high-cost performance needed for transition from the "copper cable era" to the "optical fiber era".

An optical distribution network (ODN) is typically composed of an optical fiber and a passive optical splitter, and plays a role of providing optical transmission channels between the OLT and the ONU.

Based on the aforementioned network architecture, the following embodiments of the present disclosure are proposed.

Figure 2:
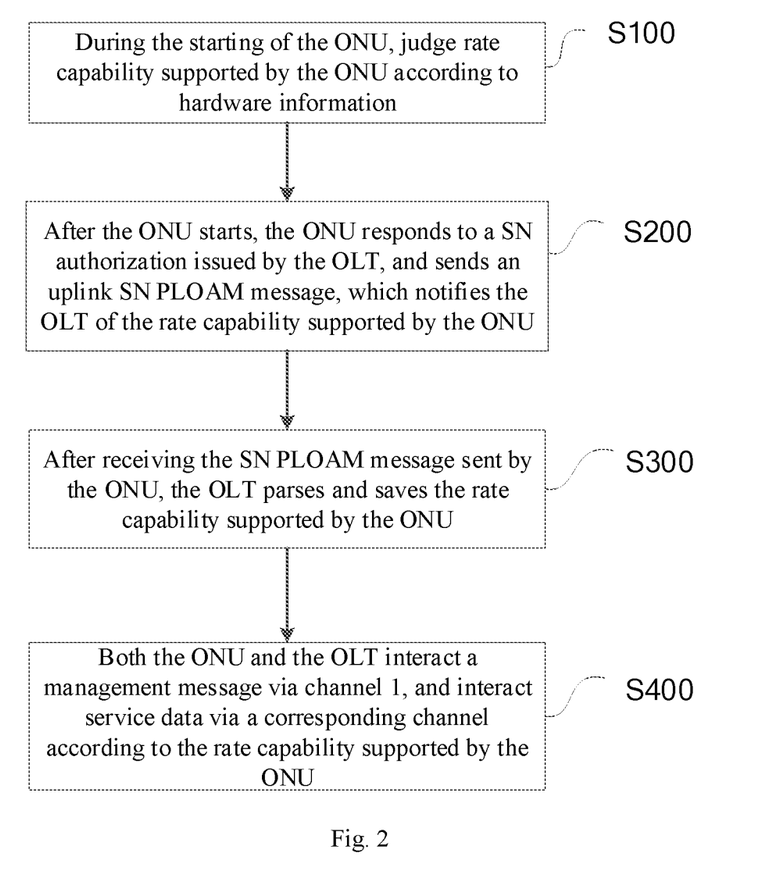
FIG. 2 is a flowchart of a method for multi-rate data interaction in an optical network in the 100G-PON system according to an embodiment of the present disclosure.

FIG. 2 is a flowchart of a method for multi-rate data interaction in an optical network in the 100G-PON system according to an embodiment of the present disclosure.

As shown in FIG. 2, according to an embodiment of the present disclosure, a method for simultaneously registering ONUs supporting multiple rates in a 100G-PON port by an OLT according to supported rate capabilities of the ONUs reported by SN (Serial Number) messages is provided. The optical network units (ONU) in the 100G-PON system are connected with the optical line terminal (OLT) through four wavelength channels including a first channel, a second channel, a third channel and a fourth channel. The method includes steps of S100 to S400.

At S100, during the starting of the ONU, the rate capability supported by the ONU is judged according to hardware information.

At S200, after the ONU starts, in an SN (O2-3) state, the ONU responds to a SN authorization issued by the OLT, and sends an uplink Serial Number (SN) Physical Layer Operations, Administration and Maintenance (PLOAM) message, which notifies the OLT of the rate capability supported by the ONU.

At S300, after receiving the SN PLOAM message sent by the ONU, the OLT parses and saves the rate capability supported by the ONU.

At S400, both the ONU and the OLT interact a management message via channel 1, including an embedded Operation Administration and Maintenance (OAM) message and an Optical network terminal (ONT) Management and Control Interface (OMCI) message, and interact service data via a corresponding channel according to the rate capability supported by the ONU.

As shown in FIG. 1, if an OLT interacts service data with at most four types of ONUs (25G ONU, 50G ONU, 75G ONU and 100G ONU) via an ODN in the embodiment of the present disclosure, the 100G-PON system achieves a rate of up to 100G through four 25G channels working in parallel. To be compatible with the 25G PON ONU and the 50G PON ONU, a channel binding scheme of the embodiment of the present disclosure is as follows: the 25G ONU operates in channel 1; the 50G ONU operates in channel 1-2; the 75G ONU operates in channel 1-3; and the 100G ONU operates in channel 1-4. In other embodiments, OUNs supporting only one rate or different OUNs supporting a variety of rates may interact service data with an OLT.

Based on the aforementioned reason, according to an embodiment of the present disclosure, a method for multi-rate data interaction in an optical network is proposed, which includes the following steps: when ONUs start, rate capabilities supported by the ONUs are judged according to hardware information; after receiving a SN authorization issued by an OLT, the ONUs send uplink SN messages, which report rate modes supported by the ONUs; after receiving the SN messages reported by the ONUs, the OLT parses and saves the rate modes in the SN messages, and the ONUs and the OLT subsequently choose corresponding channels according to the rate capabilities of the ONUs to interact data, with management messages being interacted via channel 1 by default.

The method for multi-rate data interaction in an optical network provided by the embodiments of the present disclosure achieves a compatibility of a 25G ONU and a 50G ONU in a 100G-PON system by acquiring rate capabilities supported by the ONUs and interacting service data via channels corresponding to the rates according to the rate capabilities supported by the ONUs, thereby dealing with the technical problem that the 100G-PON system conflicts with existing ONUs supporting low rate capabilities, and therefore the deployment and smooth upgrade of the 100G-PON system can be facilitated.

Figure 3:
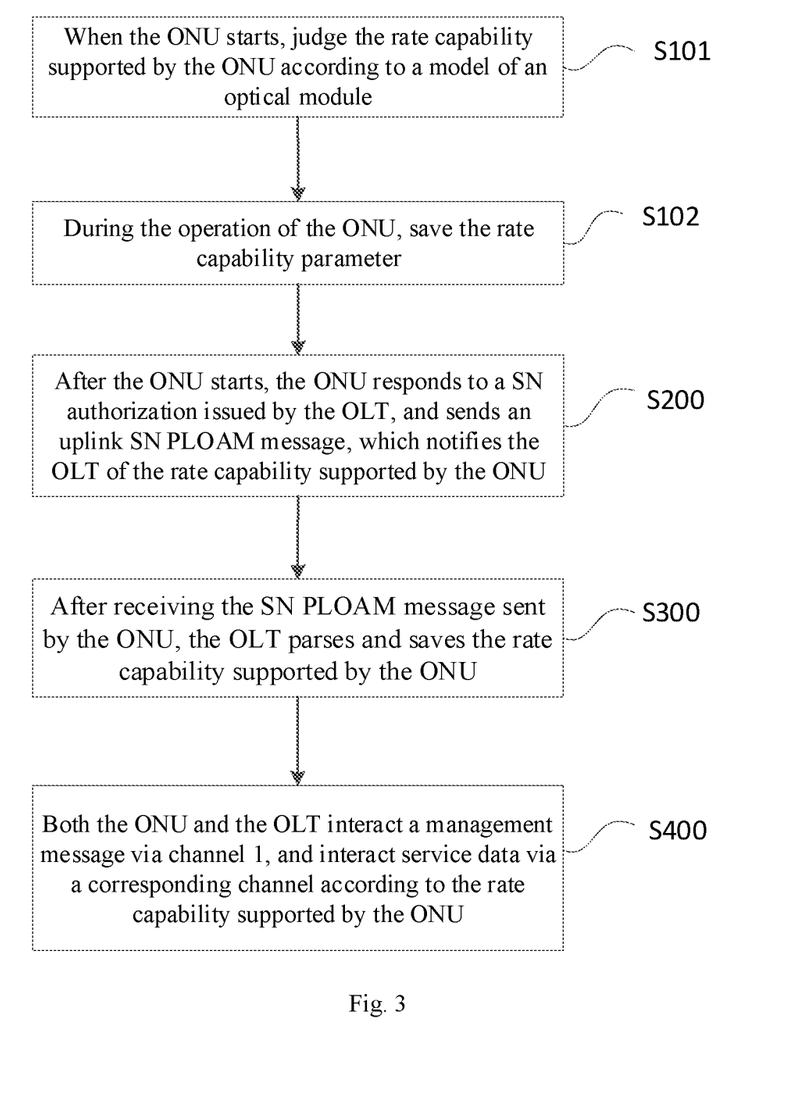
FIG. 3 is another flowchart of a method for multi-rate data interaction in an optical network in the 100G-PON system according to an embodiment of the present disclosure.

FIG. 3 is another flowchart of a method for multi-rate data interaction in an optical network in the 100G-PON system according to an embodiment of the present disclosure. As shown in FIG. 3, according to an embodiment of the present disclosure, another method for multi-rate data interaction in an optical network is provided, which includes steps of S101 to S400.

At S101, when the ONU starts, the rate capability supported by the ONU is judged according to a model of an optical modules.

At S102, during the operation of the ONU, the rate capability parameter is saved.

At S200, after the ONU starts, in an SN (O2-3) state, the ONU responds to a SN authorization issued by the OLT, and sends an uplink SN PLOAM message, which notifies the OLT of the rate capability supported by the ONU.

At S300, after receiving the SN PLOAM message sent by the ONU, the OLT parses and saves the rate capability supported by the ONU.

At S400, both the ONU and the OLT interact a management message via channel 1, including an embedded OAM message and an OMCI message, and interact service data via a corresponding channel according to the rate capability supported by the ONU.

On the basis of aforementioned embodiment one, the method for multi-rate data interaction in an optical network provided by the embodiment of the present disclosure specifically describes the method for acquiring the rate capability supported by the ONU.

Figure 4:
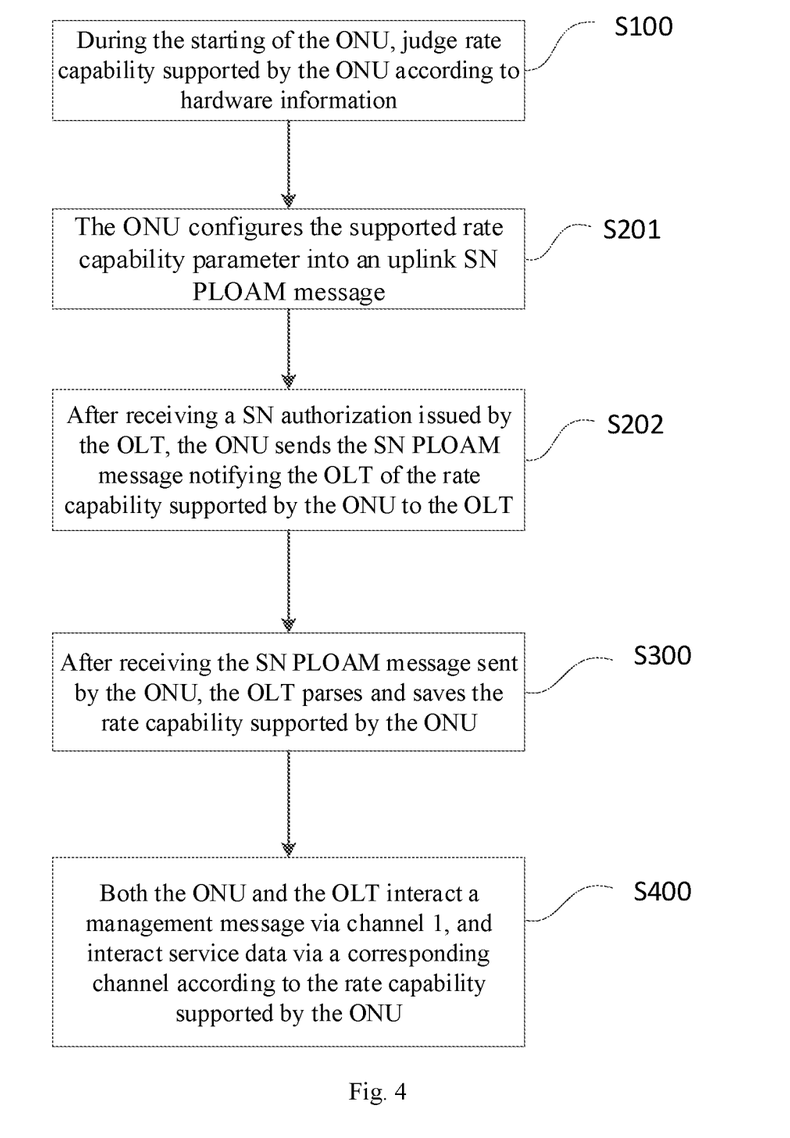
FIG. 4 is yet another flowchart of the method for multi-rate data interaction in an optical network in the 100G-PON system according to an embodiment of the present disclosure.

FIG. 4 is yet another flowchart of a method for multi-rate data interaction in an optical network in the 100G-PON system according to an embodiment of the present disclosure.

As shown in FIG. 4, according to an embodiment of the present disclosure, yet another method for multi-rate data interaction in an optical network is provided, which includes steps of S100 to S400.

At S100, during the starting of the ONU, the rate capability supported by the ONU is judged according to hardware information.

At S201, the ONU configures the supported rate capability parameter into an uplink SN PLOAM message.

At S202, after receiving a SN authorization issued by the OLT, the ONU sends the SN PLOAM message notifying the OLT of the rate capability supported by the ONU to the OLT.

At S300, after receiving the SN PLOAM message sent by the ONU, the OLT parses and saves the rate capability supported by the ONU.

At S400, both the ONU and the OLT interact a management message via channel 1, including an embedded OAM message and an OMCI message, and interact service data via a corresponding channel according to the rate capability supported by the ONU.

On the basis of aforementioned embodiment one, the method for multi-rate data interaction in an optical network provided by the embodiment of the present disclosure specifically describes the method for parsing and saving, by the OLT, the supported rate capability.

Figure 5:
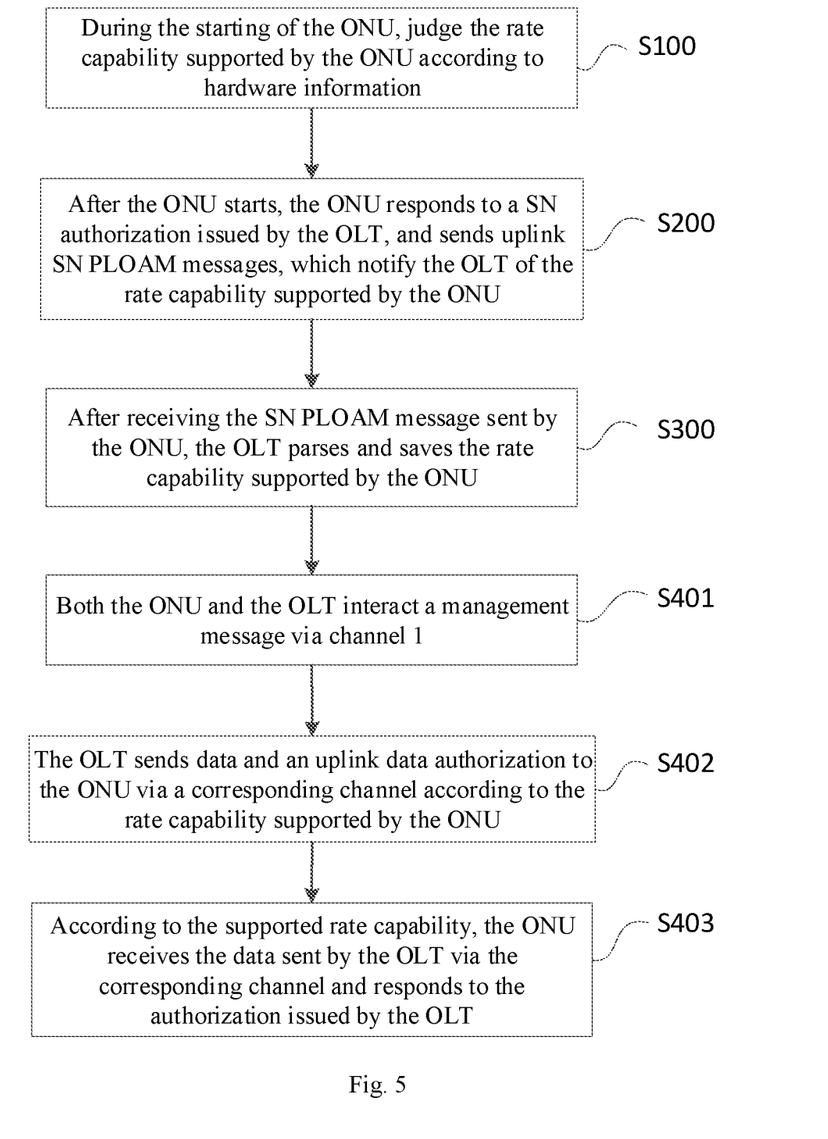
FIG. 5 is yet another flowchart of the method for multi-rate data interaction in an optical network in the 100G-PON system according to an embodiment of the present disclosure.
Figure 6:
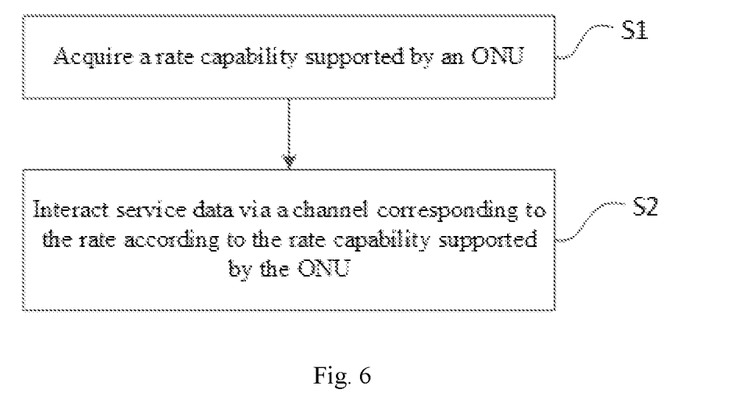
FIG. 6 is an overall flowchart of the method for multi-rate data interaction in an optical network in the 100G-PON system according to an embodiment of the present disclosure.

FIG. 5 is yet another flowchart of a method for multi-rate data interaction in an optical network in the 100G-PON system according to an embodiment of the present disclosure.

As shown in FIG. 5, according to an embodiment of the present disclosure, yet another method for multi-rate data interaction in an optical network is provided, which includes steps of S100 to S403.

At S100, during the starting of the ONU, the rate capability supported by the ONU is judged according to hardware information.

At S200, after the ONU starts, in an SN (O2-3) state, the ONU responds to a SN authorization issued by the OLT, and sends an uplink SN PLOAM message, which notifies the OLT of the rate capability supported by the ONU.

At S300, after receiving the SN PLOAM message sent by the ONU, the OLT parses and saves the rate capability supported by the ONU.

At S401, both the ONU and the OLT interact a management message via channel 1, including an embedded OAM message and an OMCI message.

At S402, the OLT sends data and an uplink data authorization to the ONU via a corresponding channel according to the rate capability supported by the ONU.

At S403, according to the supported rate capability, the ONU receives the data sent by the OLT via the corresponding channel and responds to the authorization issued by the OLT.

On the basis of aforementioned embodiment one, the method for multi-rate data interaction in an optical network provided by the embodiment of the present disclosure specifically describes the method for interacting data.

In addition, according to an embodiment of the present disclosure, a network device is also provided, which includes a memory, a processor and a computer program stored in the memory and executable by the processor, where the computer program, when executed by the processor, cause the processor to perform the method for multi-rate data interaction in an optical network according to each embodiment of the present disclosure.

In addition, according to an embodiment of the present disclosure, provided is a non-transitory computer-readable storage medium storing a computer program which, when executed by a processor, cause the processor to perform the method for multi-rate data interaction in an optical network according to each embodiment of the present disclosure.

It should be noted that the aforementioned network device and non-transitory computer-readable storage medium belong to the same concept as the embodiments of the method for multi-rate data interaction in an optical network, and specific implementations are detailed in the embodiments of the method. Moreover, the technical features in the embodiments of the method are applicable to both the network device and the non-transitory computer-readable storage medium, and therefore will not be repeated herein.

The method for multi-rate data interaction in an optical network, the network device and the non-transitory computer-readable storage medium provided by the embodiments of the present disclosure achieve the compatibility of a 25G ONU and a 50G ONU in a 100G-PON system by acquiring rate capabilities supported by the ONUs and interacting service data via channels corresponding to the rates according to the rate capabilities supported by the ONUs, dealing with the technical problem that the 100G-PON system conflicts with existing ONUs supporting low rate capabilities, and thereby the deployment and smooth upgrade of the 100G-PON system can be facilitated.

Those having ordinary skill in the art will appreciate that all or some of the steps in the methods, and systems disclosed above may be implemented as software, firmware, hardware, and suitable combinations thereof.

In a hardware implementation, the division between functional blocks/elements mentioned in the above description does not necessarily correspond to the division of physical components; for example, one physical component may have multiple functions, or one function or step may be co-executed by several physical components. Some or all of the physical components may be implemented as software executed by a processor, such as a central processing unit, a digital signal processor or microprocessor, or as hardware, or as an integrated circuit, such as an application specific integrated circuit. Such software may be distributed on a computer readable medium, which may include computer storage media (or non-transitory media) and communication media (or transitory media). As is well known to those having ordinary skill in the art, the term computer storage medium includes volatile and nonvolatile, removable and non-removable media implemented in any method or technology for storing information (such as computer readable instructions, data structures, program modules or other data). Computer storage media includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage device, or may any other medium used to store desired information and that can be accessed by a computer. Moreover, it is well known to those having ordinary skill in the art that communication media typically includes computer readable instructions, data structures, program modules, or other data in a modulated data signal, such as a carrier wave or other transport mechanism, and may include any information delivery media.

The exemplary embodiments of the present disclosure have been described above with reference to the accompanying drawings, and the scope of claims of the present disclosure is not limited thereby. Any modifications, equivalent substitutions and improvements made by those having ordinary skill in the art without departing from the scope and essence of the present disclosure shall fall within the scope of claims of the present disclosure.

The invention claimed is:

1. A method for multi-rate data interaction in an optical network, comprising:
acquiring a rate capability supported by an optical network unit (ONU); and
interacting service data via a channel corresponding to the rate according to the rate capability supported by the ONU;
wherein the step of acquiring the rate capability supported by the ONU comprises:
judging the rate capability supported by the ONU according to hardware information during the starting of the ONU;
after the ONU starts, responding to a SN authorization issued by an optical line terminal (OLT), and sending a SN PLOAM message including the rate capability supported by the ONU to the OLT; and
after receiving the SN PLOAM message sent by the ONU, parsing and saving, by the OLT, the rate capability supported by the ONU.

2. The method for multi-rate data interaction in an optical network of claim 1, wherein the rate capability supported by the ONU comprises: 25G rate capability, 50G rate capability, 75G rate capability and 100G rate capability.

3. The method for multi-rate data interaction in an optical network of claim 2, wherein the channel comprises:
   a single wavelength channel comprising a first channel corresponding to 25G rate capability;
   two wavelength channels comprising a first channel and a second channel corresponding to 50G rate capability;
   three wavelength channels comprising a first channel, a second channel and a third channel corresponding to 75G rate capability; and
   four wavelength channels comprising a first channel, a second channel, a third channel and a fourth channel corresponding to 100G rate capability.

4. The method for multi-rate data interaction in an optical network of claim 1, wherein the step of judging the rate capability supported by the ONU comprises:
   in response to the starting of the ONU, judging rate capability supported by the ONU according to a model of an optical module; and
   saving, by the ONU, the rate capability parameter.

5. The method for multi-rate data interaction in an optical network of claim 1, wherein the step of responding to the SN authorization issued by the optical line terminal (OLT), and sending the SN PLOAM message including the rate capability supported by the ONU to the OLT comprises:
   configuring, by the ONU, the supported rate capability parameter into an uplink SN PLOAM message; and
   after the ONU receives the SN authorization issued by the OLT, including the rate capability supported by the ONU in the uplink SN PLOAM message, and sending the SN PLOAM message to the OLT.

6. The method for multi-rate data interaction in an optical network of claim 1, wherein the step of parsing and saving, by the OLT, the rate capability supported by the ONU comprises:
   after receiving the SN PLOAM message from the ONU, parsing, by the OLT, a rate mode field in the SN PLOAM message; and
   saving the rate capability supported by the ONU and other related registration information.

7. The method for multi-rate data interaction in an optical network of claim 1, wherein the step of interacting service data comprises:
   sending, by the OLT, data and an uplink data authorization to the ONU via a corresponding channel according to the rate capability supported by the ONU; and
   according to the supported rate capability, receiving, by the ONU, the data sent by the OLT via the corresponding channel, and responding, by the ONU, to the authorization issued by the OLT.

8. The method for multi-rate data interaction in an optical network of claim 3, wherein the ONU interacts a management message with the OLT via the first channel, and wherein the management message comprises an authorization message, an operation administration and maintenance (OAM) message and an optical network terminal management and control interface (OMCI) message.

9. A network device comprising a memory, a processor and a computer program stored in the memory and executable by the processor, wherein the computer program, when executed by the processor, causes the processor to perform a method for multi-rate data interaction in an optical network, the method comprising:
   acquiring a rate capability supported by an optical network unit (ONU); and
   interacting service data via a channel corresponding to the rate according to the rate capability supported by the ONU;
   wherein the step of acquiring the rate capability supported by the ONU comprises:
   judging the rate capability supported by the ONU according to hardware information during the starting of the ONU;
   after the ONU starts, responding to a SN authorization issued by an optical line terminal (OLT), and sending a SN PLOAM message including the rate capability supported by the ONU to the OLT; and
   after receiving the SN PLOAM message sent by the ONU, parsing and saving, by the OLT, the rate capability supported by the ONU.

10. The network device of claim 9, wherein the rate capability supported by the ONU comprises: 25G rate capability, 50G rate capability, 75G rate capability and 100G rate capability.

11. The network device of claim 10, wherein the channel comprises:
    a single wavelength channel comprising a first channel corresponding to 25G rate capability;
    two wavelength channels comprising a first channel and a second channel corresponding to 50G rate capability;
    three wavelength channels comprising a first channel, a second channel and a third channel corresponding to 75G rate capability; and
    four wavelength channels comprising a first channel, a second channel, a third channel and a fourth channel corresponding to 100G rate capability.

12. The network device of claim 11, wherein the ONU interacts a management message with the OLT via the first channel, and wherein the management message comprises an authorization message, an operation administration and maintenance (OAM) message and an optical network terminal management and control interface (OMCI) message.

13. The network device of claim 9, wherein the step of judging the rate capability supported by the ONU comprises:
    in response to the starting of the ONU, judging rate capability supported by the ONU according to a model of an optical module; and
    saving, by the ONU, the rate capability parameter.

14. The network device of claim 9, wherein the step of responding to the SN authorization issued by the optical line terminal (OLT), and sending the SN PLOAM message including the rate capability supported by the ONU to the OLT comprises:
    configuring, by the ONU, the supported rate capability parameter into an uplink SN PLOAM message; and
    after the ONU receives the SN authorization issued by the OLT, including the rate capability supported by the ONU in the uplink SN PLOAM message, and sending the SN PLOAM message to the OLT.

15. The network device of claim 9, wherein the step of parsing and saving, by the OLT, the rate capability supported by the ONU comprises:
    after receiving the SN PLOAM message from the ONU, parsing, by the OLT, a rate mode field in the SN PLOAM message; and
    saving the rate capability supported by the ONU and other related registration information.

16. The network device of claim 9, wherein the step of interacting service data comprises:
    sending, by the OLT, data and an uplink data authorization to the ONU via a corresponding channel according to the rate capability supported by the ONU; and according to the supported rate capability, receiving, by the ONU, the data sent by the OLT via the corresponding channel, and responding, by the ONU, to the authorization issued by the OLT.

17. A non-transitory computer-readable storage medium storing a computer program which, when executed by a processor, cause the processor to perform a method for multi-rate data interaction in an optical network, the method comprising:

acquiring a rate capability supported by an optical network unit (ONU); and interacting service data via a channel corresponding to the rate according to the rate capability supported by the ONU;

wherein the step of acquiring the rate capability supported by the ONU comprises:

judging the rate capability supported by the ONU according to hardware information during the starting of the ONU;

after the ONU starts, responding to a SN authorization issued by an optical line terminal (OLT), and sending a SN PLOAM message including the rate capability supported by the ONU to the OLT; and after receiving the SN PLOAM message sent by the ONU, parsing and saving, by the OLT, the rate capability supported by the ONU.

* * * * *